3,039,223
FISH LURE RETRIEVER
William T. Pavek, 2745 Ridgeland Ave., Berwyn, Ill.
Filed Nov. 27, 1957, Ser. No. 699,409
9 Claims. (Cl. 43—17.2)

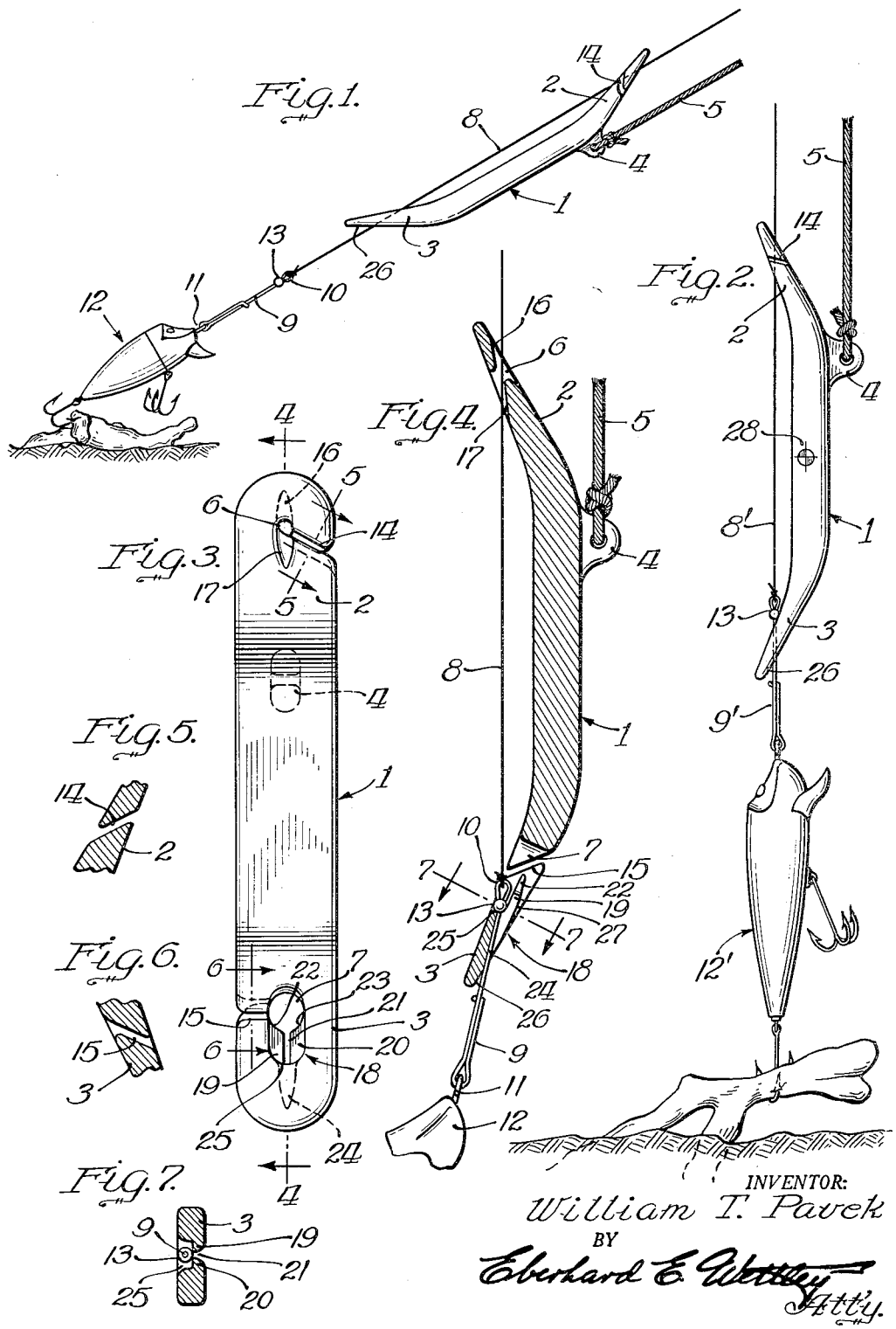

This invention relates to a fishing lure retriever. More specifically the retriever is of the character that follows a fishing line and which incorporates a unique latch means that is guided by the fishing line into hook-on engagement with a part of the lure per se or with a metal wire leader or part thereof attached to such a lure.

One of the objects of the invention, therefore, is to provide a fish line supported and fish line guided lure retriever manipulated by a strong cord or rope that is attached to the retriever with the latter having integral fixed coacting latch means to automatically engage a metal leader or leader part on the lure to form a strong union between such elements whereby to loosen and free the lure by a pull on the retriever cord.

Another object of this invention is to provide a fish lure retriever with fixed latch means formed rigidly and integrally with the retriever body and at one end thereof with the cord attachment means at the other end of the retriever body, with said means so related to the center of gravity of the retriever to cause the body thereof to rotate in a direction to promote latching engagement with a part of the lure structure or with the metal wire leader part attached to the lure per se.

Other objects and advantages inherently associated with the fishing lure retriever of this invention will hereinafter appear or become evident from the following detailed description having reference to the accompanying drawing forming part of this specification.

In the drawing:

FIG. 1 is a side elevational view of the fish lure retriever of the disclosed invention as the same appears in use and in a position about to engage a part of a metal leader attached to a snagged fish lure;

FIG. 2 is another side elevational view of the fish lure retriever illustrating the same in use, but occupying another cooperative relationship with respect to a snagged fish lure and as latched to the leader of the lure;

FIG. 3 is a plan view of the lure retriever showing the face portion of the concave side of the retriever with all of the lines being omitted for the sake of clarity;

FIG. 4 is a longitudinal cross sectional view taken through a long median vertical plane of the lure retriever and substantially coincident with the line 4—4 in FIG. 3 looking in the direction of the arrows;

FIG. 5 is a fragmentary detailed cross sectional view of the upper slot portion of the retriever body and as the same appears along the plane of the line 5—5 in FIG. 3;

FIG. 6 is another fragmentary detailed cross sectional view of the lower slot portion of the retriever body and as the same appears when viewed along the plane of the line 6—6 in FIG. 3; and FIG. 7 is a transverse cross sectional view of the latch portion of the retriever body as the same appears when viewed along the plane of the line 7—7 in FIG. 4 of the drawing.

The fish lure retriever essentially comprises a weight unit having a longitudinal body 1 with upturned ends or wings 2 and 3 imparting a concave form to the body to normally face the fish line in spaced relation thereto and having a cord attachment ear 4 at one end of the body, but on the convex side thereof to receive the attached cord or rope 5 for manipulating the lure retriever. The body 1 is held out of frictional contact with the fish line through said wings 2 and 3.

Upper and lower openings 6 and 7 are formed in the wings 2 and 3, respectively, to provide continuous two point support for the retriever unit from the fish line. These openings 6 and 7 are located on the long median plane of the body 1 as viewed in FIG. 3 penetrating the wing material to receive portions of a fish line 8 therethrough, with body 1 providing top and bottom flat faces that are arranged to lie along the length of the fish line 8, but adjacent thereto as best seen in FIG. 1. Line 8 is connected with a leader 9 at the end loop 10 with the other looped end of the leader being secured to a screw ring 11 secured to the nose of a lure 12.

While there are many types of leaders on the market having enlarged parts thereon as well as lures which have enlarged nose parts or screw rings, leader 9 is illustrated with an enlarged part in the form of a fixed bead 13 to close the fish line attachment end loop 10. As another example, the loop of the leader 9 may be formed by curling the loose loop end about the stem of the leader forming an appropriate enlargement to which the lure retriever may be latched.

For purposes of illustration, however, the leader 9 is herein shown as provided with the enlarged mechanical bead or soldered sphere 13 to which the retriever can be automatically latched to provide a union between the retriever and leader of the lure to thereby relieve the fish line 8 from any strain or excessive tension when the cord 5 is pulled to loosen the snagged lure 12.

Referring to FIGS. 3, 4, 5 and 6, it should be noted that access to each of the retriever openings 6 and 7 is provided by lateral slots 14 and 15 formed into and through the retriever material. These slots are oppositely related to the edges of the flat face portion of the body 1, and as shown in FIGS. 3, 5 and 6, the slots are further oppositely angled in relation to each other and also in relation to respective planes considered normal to the surface of the wings 2 and 3 and coincident with the slot locations. In addition slot 14 is angled or inclined at a slant to a transverse plane of the face of the body 1 to provide a double angle slot that will readily prevent lateral displacement of a fish line threaded through the opening 6 in wing 2, or vice versa, and counteract dislodgement of the retriever from the threaded fish line.

In this same connection, it should be observed that slot 15, while disposed at an angle to a vertical transverse plane to the surface of wing 3, it is made to enter the wing opening 7 at right angles to the length of body 1. While slot 15 may also be made to include the second angle of edge approach to opening 7 as at opening 6, this is not deemed absolutely necessary since the fish line 8 receives further threaded retention at the latch end of the body 1 by certain of the latch parts as will hereinafter be explained.

Before describing the latch means of the retriever, it should also be noted that the slots 14 and 15 are oppositely inclined through the thickness of the wings 2 and 3 of body 1 as best seen in FIGS. 5 and 6 and in directions wherein the run of the fish line at the slot locations will generally have a tendency to thread through the openings at the slots in opposite angular positions with respect to the inclinations of the slots.

As a further aid to the efficiency of the operation of the retriever, the wing 2 includes relieved or sloping recesses 16 and 17 in areas along the approach or path of the fish line to opening 6 as the line threads through opening 6 to thereby reduce operative friction of the body 1 along line 8 to a minimum as best viewed in FIGS. 3 and 4.

The latch structure 18 in wing 3 is a completely rigid construction of coacting body parts associated with wing opening 7, all adapted to hook on or latch on to an enlarged leader part, plug or lure part disposed in the path of travel of the retriever as the latter is guided along the fish line 8. The latch means comprises a pair of coacting coplanar fins 19 and 20 separated by a slot 21 with the fins being arranged intermediate the thickness of wing 3 as best illustrated in FIG. 4. The wings 19 and 20 are curved rearwardly at 22 and 23 to permit the fish line 8 to readily enter slot 21 and to dispose the adjacent run of the line outwardly along a friction reducing clearance recess 24 at the underside of wing 3. Slot 21 will steady and retain the line 8 within the retriever opening 7 and any attached leader parts in the vertical plane of the slot 21 and line 8 cannot become dislodged or removed out of the inclined slot 15. Both the slot 21 and inclined slot 15 act to counteract or prevent line dislodgement or retriever displacement as is obvious from the construction described.

The upper portion of the opening 7 in wing 3 is extended and elongated over the fins 19 and 20 to terminate in a shoulder 25 providing a latch stop at this point for a leader part such as the bead 13 as best illustrated in FIGS. 3 and 4. In this connection, the underside of the tip 26 of wing 3 and the sloping recess 24 act as cooperative cam means to permit the leader and leader parts to enter the opening 7 of wing 3 as the retriever is permitted to ride along the fish line 8. This movement of the retriever toward the lure will allow the end loop 10 of the leader 9 and bead 13 to enter the opening 7 as further aided or guided by the under cam portions 27 of the fins and retraction of the retriever by core 5 will cause the stem part of the leader to enter slot 21 with the bead 13 and ring loop 10 of the leader passing into the upper elongated portion of the opening 7 and along the top surfaces of the fins 19 and 20. The bead 13 will become firmly engaged by the latch stop shoulder 25 to arrest any further relative movement between the retriever and fish line parts under these latched conditions. A firm pull on cord 5 will now be transmitted through the leader 9 directly to the lure 12 to transfer all strain away from the fish line to the auxiliary attached means for loosening the snagged lure.

Conceivably, the angle of the line 8 may be varied greatly to best suit conditions of operation. In contrast to FIG. 1, the line 8 may be shifted into a generally vertical location with respect to the surface of the water as in FIG. 2 to release a snagged lure such as 12′ connected by a leader 9′ to the fish line 8′. This position eliminates fish line support of the body weight of the retriever which is suspended entirely by the cord 5.

When the retriever is used as in FIG. 1, the offset body 1 will obviously be suspended by the wings that are in operative supported contact with the fish line and fish line parts through gravity. Gravity, therefore, favors and causes the retriever latch means to follow the fish line and to hook onto the leader bead when the fish line is angularly disposed as in FIG. 1.

When the retriever is used as in FIG. 2, the center of gravity of the body, which is generally indicated at 28, between the axes of lines 5 and 8′, so that a pull on the tow line or cord 5 connected to the offset attachment ear 4 will tend to pivot the retriever in a counter-clockwise manner about the line 8′ at opening 6 in wing 2, thus swinging the body 1 and its wing 3 with the latch parts thereof into operative relation and subsequent engagement with the leader bead, particularly during the retriever retraction after leader and/or lure contact has been established.

The foregoing description has been directed to a specific form of the invention as portrayed by the disclosure thereof as illustrated in the drawing. It is contemplated that certain changes may be made in the exact construction shown without actually departing from the fundamental concept of the invention. The extent of such changes shall, however, be governed by the breadth and scope of the language in the appended claimed subject matter as it relates to the fish lure retriever of the present invention.

What I claim is:

1. In a fish lure retriever, a body element, wing elements on the body element extending outwardly from one face thereof, said wing elements each having fish line orientation openings penetrating the wing element material to constantly carry said body element from separated points of support upon said fish line and for stabile disposition in close proximity adjacent the length of the fish line, latch means on one of the aforesaid elements and arranged to engage a fish lure part, and connecting means on said body element to receive a cord to manipulate said body element, said connecting means and said latch means being disposed to opposite sides of said body element whereby a pull on said cord will act to rotate the body element relative to said fish line to urge and to hold said latch means in an operative latching position with respect to said fish lure part.

2. A fish lure retriever for attachment with a part of a lure assembly comprising an elongated body, said body having spaced portions thereof angularly bent out of the extended longitudinal portion of said body to provide separate spaced angular wings terminating to one side of the body, said body wings being penetrated by openings formed therethrough to receive a fish lure line, said body wings having line access slots formed through lateral outward edges thereof and communicating with said wing openings to permit body assembly with a lure line by entry of the line into the wing openings through said access slots, said access slots of said wings being disposed in oppositely outwardly related edge portions of the body wings, and latch means carried by said body for attachable connection with said lure assembly.

3. A fish lure retriever for attachment with a part of a lure assembly comprising a single elongated body, a latch means on said body for connection with said lure assembly, said body having coacting openings formed therethrough to permit body assembly with a lure line, said openings being longitudinally separated and transversely penetrating said body per se to receive said lure line therethrough, said body having entry slots formed into longitudinal edge portions thereof to communicate with said transverse openings respectively to provide lure line access to said openings, at least one of said slots extending diagonally transversely inwardly with respect to its entry edge on said body and toward its lure line opening, said one slot being tilted through the thickness of said body to establish an entry slot having a double cant leading to the body penetrating lure line opening.

4. A fish lure retriever for attachment with a part of a lure assembly comprising an elongated body providing latch means to hook onto said lure part, said body having coacting openings formed therethrough to guide the body along a fish line to said lure part, said coacting openings providing fish line threading openings penetrating said body at longitudinally spaced points along the length of the body, said body having laterally arranged access slots formed into edge portions thereof for communication with said body openings respectively, said body latch means comprising a latch slot formed in the body and arranged in the direction of the run of the fish line, said slot having an entrance end communicating with one of the adjacent lure line body openings and terminating remote from said opening at a point disposed between the opening and the terminal end of said body adjacent the opening.

5. In a fish lure retriever as in claim 4 wherein the latching means of the body is inclined away from the general longitudinal axis of the body to expose a surface portion of said body for lure part contact adjacent said latch slot to guide said lure part to said slot as directed by the attached run of the fish line entrained in said body openings.

6. In a fish lure retriever for attachment with a part of a lure assembly comprising a unitary elongated body having latch means thereon to hook onto said lure part, said body having separated coacting openings formed therethrough to guide said body along a fish line toward said lure part, said coacting body openings being located at longitudinally spaced locations along said elongated body and transversely penetrating said body from face to face upon upright axes, said body having access slots formed into laterally disposed edge portions of the body for communicating with said body openings respectively to permit fish line access into the openings, said slots being inclined in the vertical direction of said body and inclined with respect to their corresponding body openings to thereby provide retention means to counteract flush line displacement from within said upright body openings during the normal operation of said lure retriever.

7. In a fish lure retriever as set forth and defined in claim 6 wherein said laterally disposed access slots in said body edges have inclinations that are oppositely related to each other considered in the vertical direction of the body of the retriever and with respect to the upright axes of the fish line openings in said body.

8. A fish lure retriever for attachment with a connected lure part comprising a body including latch means to hook onto said lure part, said body having spaced coacting means to guide said body along a fish line to said lure part, said coacting body means comprising openings formed into said body for said fish line and having access slots formed into the body and disposed inwardly from the edges of the body to said openings to permit threading said fish line into said body openings, said body access slots being inclined to the vertical taken through the thickness of the body to counteract line displacement from within said body openings, said body comprising an elongated flat element having inclined wings thereon with said fish line openings and access slots being located in said body wings, said slots being disposed at given angles through the thicknesses of the body wings respectively and being angularly positioned with respect to the run of the fish line portions that are threaded through said fish line openings in said wings.

9. A fish lure retriever comprising a single unitary elongated body providing oppositely related flat surfaces thereon, said body having spaced open portions formed through said flat surfaces and from face to face with respect to said body to receive a fish line through said open portions for the support of said body and to orient said line in a given relation with respect to one side of the body and adjacent to one of the flat surfaces thereon, latch means on said body to engage an enlarged part on a lure connected element comprising fin members on said unitary body arranged to flank said fish line and to provide a slot therebetween to guide the line between such fins, and a stop shoulder on said body disposed in a given relation with respect to said fins and the fin slot to provide means to engage and to hold the enlarged part on said lure connected element, said fin members of said latch means on said body being positioned to flank one of said open portions of said body in the direction of the run of the fish line with the slot between said fins having open communication with said one open portion of the unitary body, said unitary body having access slots therein extending from the exterior of the body into the open portions of the body to provide entry means to permit threading a fish line into the open portions of the body to position said line in operative relation with respect to the body and to said latch means, said access slots of the open portions of said body being formed into the body material and arranged to open outwardly on opposite edge portions of said body to further counteract accidental line release or withdrawal from the retriever body or displacement of said retriever from said line.

References Cited in the file of this patent
UNITED STATES PATENTS

| | | |
|---|---|---|
| 893,173 | Kunze | July 14, 1908 |
| 2,459,287 | Robbins et al. | Jan. 18, 1949 |
| 2,599,973 | Bujaky | June 10, 1952 |
| 2,765,567 | Fifer | Oct. 9, 1956 |
| 2,828,570 | Bradbury | Apr. 1, 1958 |
| 2,889,655 | Switzer | June 9, 1959 |